Feb. 20, 1923.
D. TURNER.
THROW-OUT CONNECTION FOR MEASURING MACHINES.
FILED MAY 3, 1920.
1,446,281.
3 SHEETS—SHEET 1.
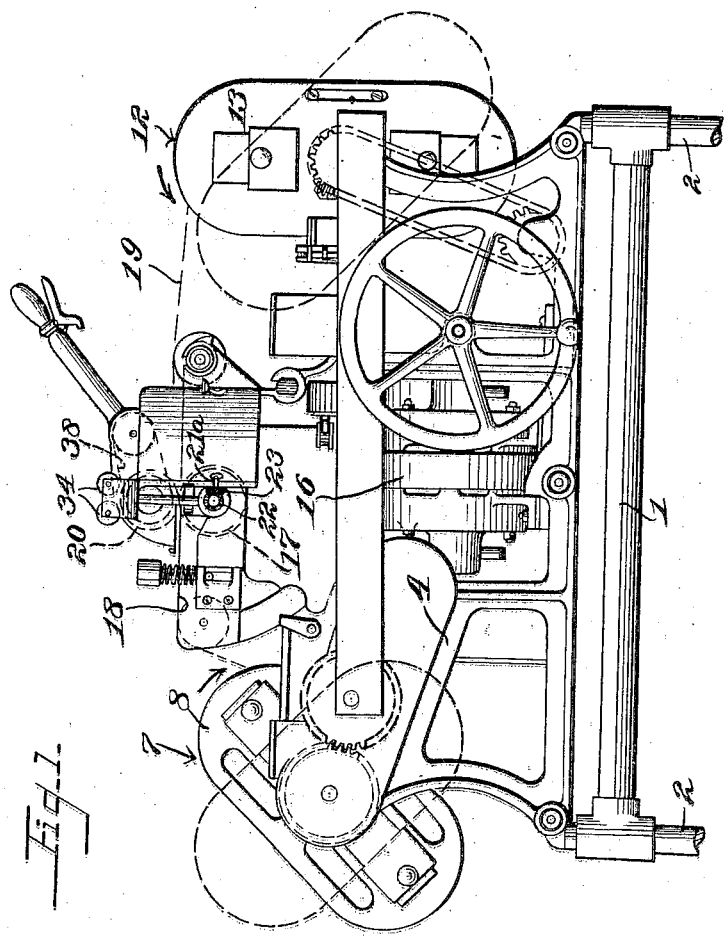
Inventor:
Douglas Turner,
by Elliott Ammen
his Attys.

Feb. 20, 1923. 1,446,281.
D. TURNER.
THROW-OUT CONNECTION FOR MEASURING MACHINES.
FILED MAY 3, 1920. 3 SHEETS—SHEET 2.
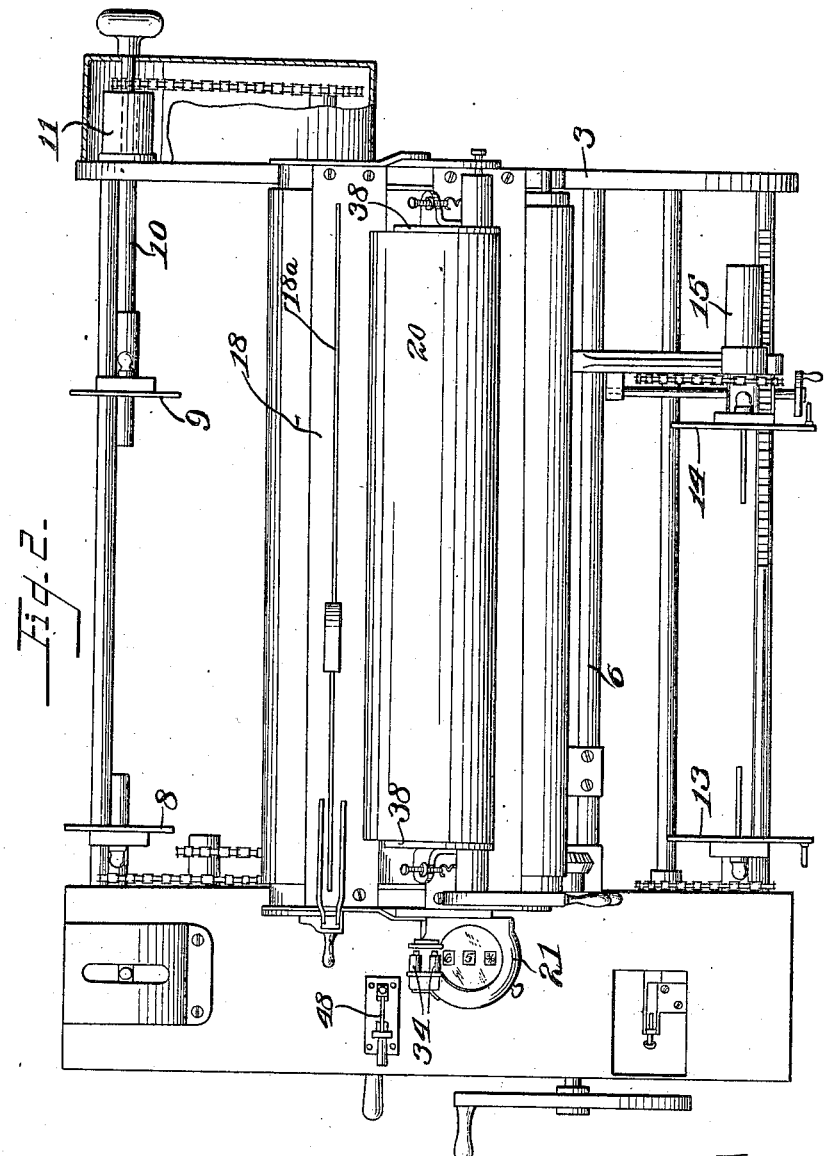
Inventor:
Douglas Turner,
by Elliott + Thummer
his Attys.

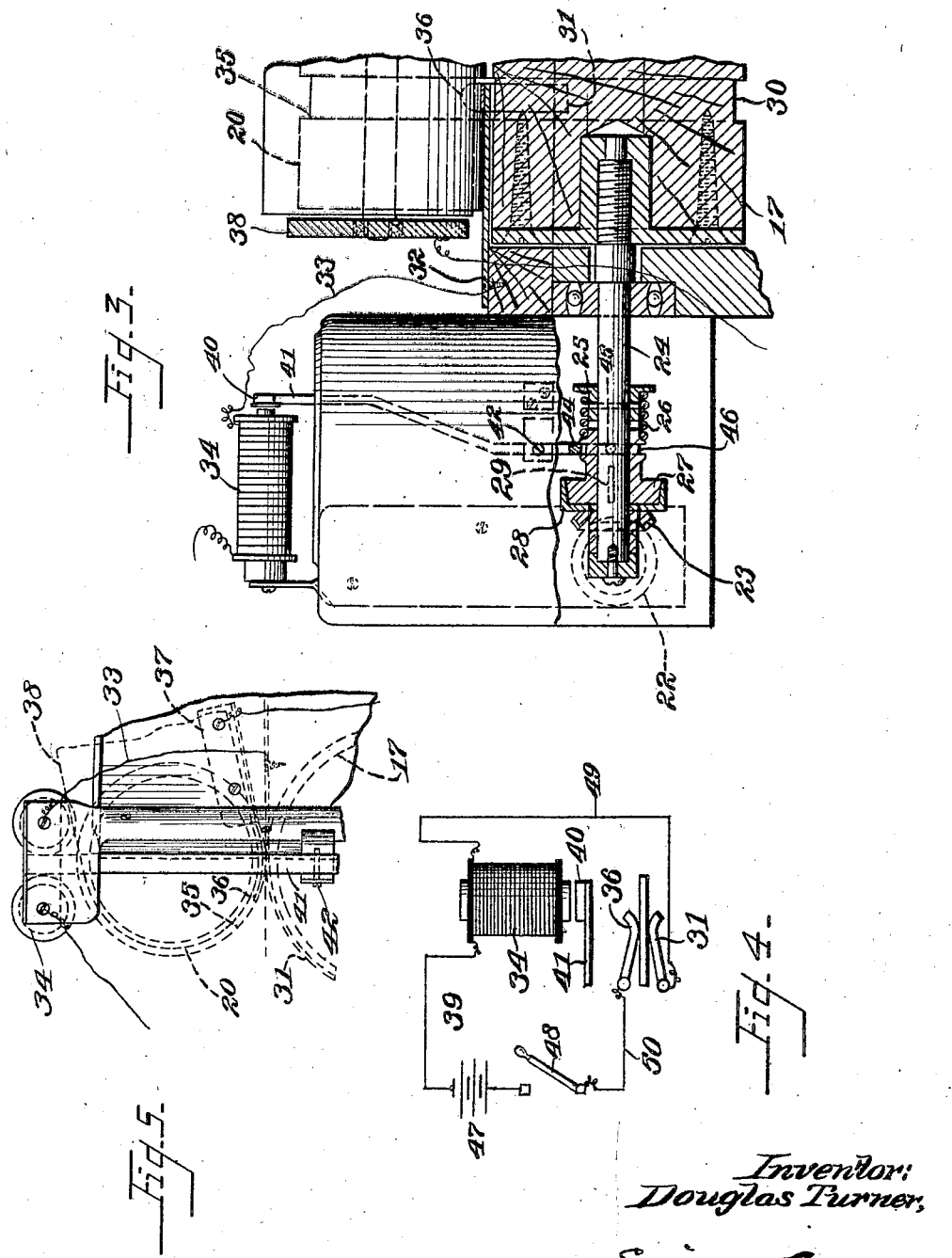

Patented Feb. 20, 1923.

1,446,281

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION.

THROW-OUT CONNECTION FOR MEASURING MACHINES.

Application filed May 3, 1920. Serial No. 378,434.

*To all whom it may concern:*

Be it known that I, DOUGLAS TURNER, a citizen of the United States, residing in the city of St. Louis and State of Missouri, have invented new and useful Improvements in Throw-Out Connections for Measuring Machines, of which the following is a specification.

This invention relates to cloth winding and measuring machines, such as are used for measuring the length of cloth in bolts or rolls. Such machines are very useful in checking over goods sold by the bolt, and in taking stock of material still left in partially used bolts. With cloth winding machines of this type it is customary to employ a small measuring machine, the indicating mechanism of which is advanced by the cloth as it passes the measuring machine. The cloth frequently acquires considerable speed in passing the measuring machine, as a consequence of which the measuring roller that drives the indicating mechanism may continue to rotate after the end of the web has left it; this, of course, would produce an inaccuracy in the measurement. The general object of my invention is to prevent such an inaccuracy and to provide automatic means for stopping the actuation of the measuring machine when the end of the web leaves the measuring roller.

Further objects of the invention will appear hereinafter.

The invention consists in the novel device and in the general combination of parts to be particularly described hereinafter, all of which contribute to produce a simple and efficient throw-out connection for cloth measuring machines. A preferred embodiment of my invention will be particularly described in the following specification. While the broad scope of my invention will be pointed out in the appended claims.

In the drawing Figure 1 is a side elevation of a cloth winding machine embodying my invention.

Figure 2 is a plan, certain parts being broken away.

Figure 3 is a detail view, partially in section and partially in elevation, further illustrating details of the throw-out connection.

Figure 4 is a diagrammatic view illustrating the electric wiring.

Figure 5 is a fragmentary side elevation further illustrating the relation of the contacts.

In carrying out my invention I provide an under frame 1, including legs 2 for supporting the machine at a convenient height above the floor.

The frame proper of this machine includes two oppositely disposed side frames 3 and 4, the latter of which supports most of the mechanism of the machine. These sides frames are connected rigidly together by horizontal frame bars designated generally by the number 6.

The winding mechanism includes a receiving reel 7, (see Fig. 1) which comprises a winding head or receiving head 8 carried by the end frame 4, and an adjustable receiving head 9 which is carried in the side frame 3. This receiving head 9 is in axial alignment with the co-operating head 8 and is made adjustable by attaching it to a shaft or stem 10, mounted to slide through a bearing 11 attached on the side frame 3.

On the opposite side of the machine there is mounted a supply reel 12 which consists of a supply winding head 13, rotatably mounted on the side frame 4, and a winding head 14 aligning with it and supported near the side frame 3. This winding head 14 is adjustable toward or from the head 13. For this purpose it is carried upon a shaft mounted rotatably in a long bearing 15.

I provide means for driving the receiving heads 8 and 9 in synchrony with each other, and means for driving the winding heads 13 and 14 in synchrony with each other. I also provide differential means for driving the reels, that is to say, the reel composed of the pair of heads 8 and 9 is driven differentially with the reel composed of the pair of heads 13 and 14. The effect of this differential driving is to impart differential rotation to both reels. That is to say, I not only drive the reel that the cloth is winding upon, but I also drive the reel that the cloth is winding from. This increases the accuracy of the measurement by avoiding subjecting the cloth to unnecessary tension.

The reels may be driven by means of an electric motor 16 through any suitable mechanism, not illustrated, (see Fig. 1).

Referring to Figure 1, between the reels 7 and 12, and rotatably supported in the side frames 3 and 4, I provide a measuring roller 17, the upper face of which is about on a line with the upper face of a table 18, across which the web 19 of fabric or cloth passes in the winding operation.

Co-operating with this measuring roller 17, I provide a presser roller 20, (see Figure 1,) which rests upon the upper side of the fabric and presses the same against the measuring roller with sufficient force to insure that the measuring roller will be rotated by the fabric without slippage as the fabric passes.

The indicating mechanism is mounted in a small measuring machine 21, (see Fig. 2), the actuating shaft 21ª of which is driven by means of a bevel gear indicated at 22, (see Fig. 3), which meshes with a corresponding bevel gear 23, which is driven by a shaft 24 projecting from the axis of the measuring roller 17, (see Fig. 3.)

I provide automatic means for disconnecting the drive from the shaft 24 to the indicating mechanism when the end of the web being measured passes the measuring roller.

I shall now describe the preferred means for this purpose. On the shaft 24 there is rigidly mounted a collar 25 carrying a coil spring 26, the outer end of which presses against a movable clutch member 27 and normally holds this clutch member 27 firmly against the clutch member 28, which is rigid with the bevel gear 23; the clutch member 27 is rotated continuously by the shaft 24 by means of a spline or feather 29, but the clutch member 28 and the bevel gear 23 are loose on the shaft. With this construction it is evident that when the clutch member 27 engages the clutch member 28, the measuring machine 21 will be driven. The measuring roller 17 is provided with a circumferential groove 30, in which lies an arcuate metallic contact strip 31, which is carried at the end of a metallic tongue 32 connected to a conductor 33, leading to an electro-magnet 34. The presser roller 20 is also provided with a circumferential groove 35, (see Fig. 3) similar to and opposite to the groove 30, and into this groove 35 an arcuate metal contact 36 extends, the same being attached by screws to a metal clip 37 which is carried on a metal arm 38, which supports one end of the presser roller. There are two of these arms 38 that support the presser roller between them, (see Figures 1 and 2.) I provide an electric circuit 39, (see Figure 4,) which connects up these contacts 31 and 36. These contacts are in the form of springs tending to come together, and when they are in engagement with each other the circuit is closed; however, when the machine is measuring cloth, the web of cloth or fabric 19 is disposed between the contacts, holds them apart and insulates them from each other. The controlling circuit 39 includes the electro-magnet 34 which is mounted on the upper side of the measuring machine 21 and in a position to attract an armature 40, attached to the upper end of a lever 41, which lever is pivoted at 42; (see Figure 3) the lower end of this lever is formed into a yoke 44 carrying pins 45, which engage in the groove 46 formed in the sliding clutch member 27. The circuit 39 also includes a suitable source of E. M. F. such as a battery 47, and at a suitable point on the winding machine a switch 48 is provided which should be closed when the machine is in operation. A conductor 49 connects the electro-magnet with the contact 31, while another conductor 50 connects with the upper contact 36.

It is evident that as soon as the end of the web, or fabric, leaves the descent of the measuring roller, the contacts 31 and 36 will come into contact with each other by reason of their resiliency, and this will close the circuit and open the clutch composed of the two members 27 and 28, thereby stopping the driving of the indicating mechanism.

The operation of the complete machine will now be briefly stated. A bolt or roll of cloth is mounted on the supply reel 12 and the loose end of the fabric is pulled across the upper face of the table 18 and passed between the measuring roller 17 and the presser roller 20. The cloth is pulled forward in this way until the forward edge of the cloth comes into alignment with a cutting slot 18ª in the table, (see Figure 2.)

The indicating mechanism of the measuring instrument 21 is then turned back to zero. The end of the cloth is then pulled completely across the table and wound around the receiving reel 7. This pulling of the cloth rotates the measuring roller and measures the amount of cloth pulled past the slot 18ª in order to effect the attachment of the cloth to the receiving reel. The machine is then driven by the motor 16. When all of the cloth has been unwrapped from the supply reel 12, the loose end of the cloth will be pulled between the rollers 17 and 20. As the end of the cloth leaves these rollers the contacts 31 and 36 will come together and close the circuit, thereby opening the clutch and stopping the operation of the measuring machine. In this way an accurate measurement of the length of cloth on the bolt will be indicated by the measuring machine 21.

It is understood that the embodiment of the invention described herein is only one of the many embodiments my invention may take, and I do not wish to be limited in the operation of my invention, nor in my claims to the particular embodiment set forth.

I claim:

1. In a cloth winding machine, the combination of a frame, winding reels mounted thereupon, a measuring roller, means for guiding the web of cloth past said measuring roller to rotate the same, indicating mechanism, means whereby said mechanism is driven by said measuring roller and automatic means for disconnecting the drive from the measuring roller to the indicating mechanism when the end of the web leaves the measuring roller.

2. In a cloth winding and measuring machine, the combination of a frame, winding reels, a measuring roller over which the web of cloth is drawn, a registering mechanism actuated by the measuring roller for indicating the length of cloth pulled past the measuring roller, a clutch for driving the registering mechanism from the measuring roller, and automatic means for opening said clutch when the end of the web leaves the measuring roller.

3. In a cloth winding and measuring machine, the combination of a frame, a measuring roller rotatably mounted therein, winding reels operating to pull the cloth past the measuring roller, a metallic contact disposed on the under side of the web when passing over the measuring roller, a second metallic contact located on the upper side of the web of cloth, whereby the web separates the two contacts when the machine is in operation, a registering mechanism, a clutch for driving the same from the measuring roller, an electric circuit adapted to be closed by said contacts when they touch each other, and an electro-magnet in said circuit to effect the opening of said clutch and thereby stop the driving of the measuring machine when the end of the web leaves the measuring roller.

In testimony whereof, I have hereunto set my hand.

DOUGLAS TURNER.